Nov. 12, 1946. T. E. LAWLESS 2,410,984
SAFETY DEVICE
Filed July 5, 1944
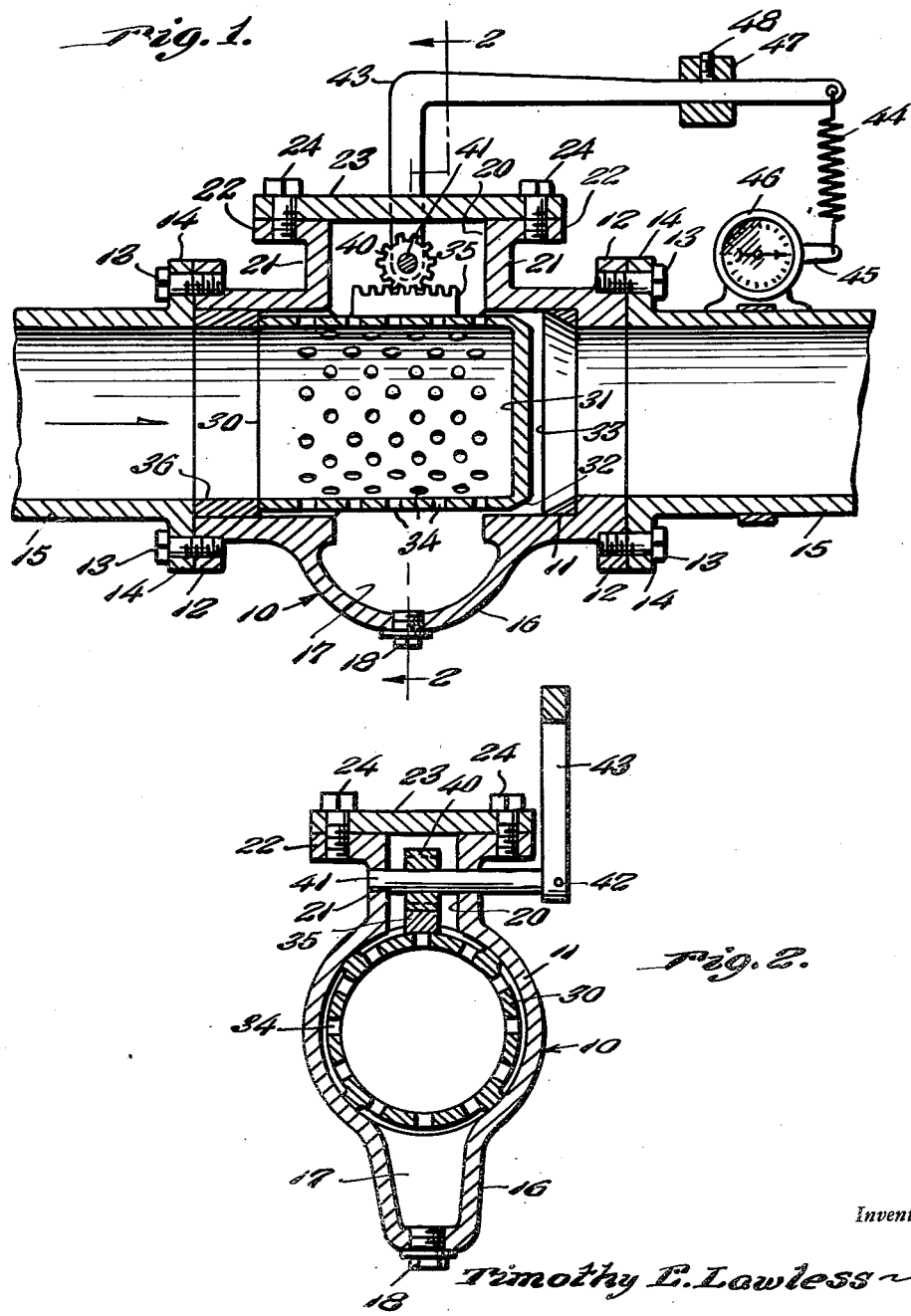
Inventor
Timothy E. Lawless
By Clarence A. O'Brien
and Harvey B. Jacobson
Attorneys Patented Nov. 12, 1946

2,410,984

UNITED STATES PATENT OFFICE 2,410,984

SAFETY DEVICE

Timothy E. Lawless, Marcellus Falls, N. Y.

Application July 5, 1944, Serial No. 543,575

6 Claims. (Cl. 137—152)

This invention relates to safety devices and more particularly to such devices adapted to be used in connection with a steam line or the like.

A primary object of this invention is the provision of a device, including a valve in a steam line, adapted to close the line upon the surge of liquid, such as water, into the line to preclude damage to the apparatus operated by the steam.

An additional object is the provision of such device which will readily permit the passage of steam through the line but immediately close the valve upon the surge of any water thereinto.

A secondary object is the provision of an indicator, in association with such a valve and safety device which will indicate the position of the valve and hence the amount of steam passing through the line at all times.

Additional objects reside in the combinations of elements, features of construction, and arrangements of parts, all as will be more fully pointed out hereinafter, and shown in the accompanying drawing, wherein there is shown a preferred form of this inventive concept.

In the drawing:

Figure 1 is a side sectional view of a steam line embodying the safety device of the instant invention, and Figure 2 is a sectional view taken along the line 2—2 of Figure 2 as viewed from the right, certain parts thereof being shown in elevation.

Like reference numerals refer to like parts throughout the several views of the drawing.

Having reference now to the drawing, a safety device for steam lines is generally indicated at 10. Safety device 10 is comprised of a body portion 11 provided with flanges 12 at either end, which flanges are adapted to be secured by a plurality of bolts 13 to adjacent flanges 14 comprising the ends of sections of pipe 15 comprising portions of a steam line or the like, steam being adapted to flow therethrough in the direction indicated by the arrow in Figure 1. Valve body 11 is generally cylindrical in form but is provided with a depending portion 16 forming a recess 17 in the base of the device, serving as a trap for such liquid as may flow thereinto in a manner to be described hereinafter. At the base of trap 16 is a suitable threaded outlet valve 18, of any desired construction to permit the draining off of liquid trapped in recess 17. The upper portion of body 11 is provided with a chamber 20 formed by extending walls 21 so formed as to provide a flange 22 at the top thereof. A cover plate 23 is secured to flange 22 as by means of suitable bolts 24 to provide a relatively air or steam tight seal.

Slidably mounted within the cylindrical portion of body 11 is a cylindrical sleeve 30 provided at one end with a closure member 31 forming a valve disk, suitably beveled at its edges as at 32, adapted to engage a valve seat 33 formed within body 11. Sleeve 30 is provided with a large number of apertures or perforations 34 therethrough, and has secured to its upper side a rack 35 adapted to fit within chamber 20, it here being pointed out that the dimensions of chamber 30 are such as to permit limited movement of rack 35 therein. The sliding movement of sleeve 30 is restricted in one direction by valve seat 33 and in the other direction by an interiorly disposed circumferential collar 36 positioned within body 11.

Rack 35 is adapted to coact with a pinion 40 fixedly secured to an axle 41, the ends of which are journaled and sealed in suitable apertures in the side walls 21 forming chamber 20. Axle 41 is secured as by a pin or set screw 42 to one end of a bellcrank lever 43 positioned exteriorly of body 11. The other end of bellcrank lever 43 engages one end of a spring 44 the opposite end of which is secured to a lever 45 which lever forms an actuating device for a suitable gauge or pressure indicator 46 mounted at a suitable point on steam line 15. Spring 44 may serve as a means for retaining bellcrank 43 in a desired position, to retain sleeve 30 and valve disk 31 in open valve position with respect to valve 33. While the spring 44 may be utilized as the sole means for accomplishing this function, if desired a weight 47 may be mounted on the arm of bellcrank lever 43 and held in position by a set screw 48. Movement of the weight along the extending arm of the bellcrank will vary the force required to move sleeve 30 into valve closing position.

From the foregoing the operation of the device should now be readily understandable. Steam flows through pipe line 15 in the sleeve 30 and passes outwardly through apertures 34 around valve disk 31 and continues in uninterrupted flow through the pipe line. However, in the event a surge of water, such as might be occasioned by foaming, or too high a level in the boiler, should come through the steam pipe, the extra pressure thus exerted against the rear surface of valve disk 31 would overcome the weight or spring tension normally keeping the cylinder open and cause the closed end or valve disk 31 of cylinder 30 to seat in valve seat 33 and thus cut off the flow of both steam and water. The increased pressure will cause the valve to remain closed until the cause of the water influx into the pipe can be determined and the trouble corrected, thus precluding the possibility of damage to the device operated by the flowing steam. Upon correction of the trouble, the water may be drained from body 11 and trap 17 by merely opening the escape valve 18, whereupon the parts will return to operating position and when steam is turned again into the pipe, the valve will remain open until such time as its use is again required in the manner above described.

From the foregoing it will now be seen that there is herein provided a safety device accomplishing all the objects of this invention including many advantages of great practical utility and commercial importance. It will also be seen that the use of this device in a steam line serves to preclude all possibility of damage to steam operated apparatus such as might be occasioned by an influx of water into such apparatus.

As many modifications may be made in this inventive concept it is to be understood that all matter hereinbefore described or shown in the accompanying drawing is to be interpreted as merely illustrative and not in a limiting sense.

I claim:

1. In a safety device for steam lines, in combination, a body having an inlet and an outlet positioned in said line, a valve seat in said body at said outlet, a valve comprised of a hollow sleeve having a relatively large number of perforations therein normally to permit unrestricted flow of steam therethrough closed at one end to form a valve disk adjacent said valve seat slidably mounted in said body, means forming a trap for liquids in said body adjacent said valve, said sleeve being open at its other end, and of a diameter substantially equal to that of said inlet, a rack on said sleeve, a pinion associated with said rack, and means associated with said pinion normally biasing said valve to open position, but adapted upon the surge of liquid into said sleeve to permit closure of said valve under the impetus of pressure of said liquid.

2. In a safety device for steam lines, in combination, a body having an inlet and an outlet positioned in said line, a valve seat in said body at said outlet, a valve comprised of a hollow sleeve having a relatively large number of perforations therein normally to permit unrestricted flow of steam therethrough closed at one end to form a valve disk adjacent said valve seat slidably mounted in said body, means forming a trap for liquids in said body adjacent said valve, said sleeve being open at its other end, and of a diameter substantially equal to that of said inlet, a rack on said sleeve, a pinion associated with said rack, and means associated with said pinion normally biasing said valve to open position, but adapted upon the surge of liquid into said sleeve to permit closure of said valve under the impetus of pressure of said liquid, said last-mentioned means comprising a lever secured to said pinion and means normally retaining said lever in position to hold said valve away from said valve seat.

3. In a safety device for steam lines, in combination, a body having an inlet and an outlet positioned in said lines, a valve seat in said body at said outlet, a valve comprised of a hollow sleeve having a relatively large number of perforations therein normally to permit unrestricted flow of steam therethrough closed at one end to form a valve disk adjacent said valve seat slidably mounted in said body, means forming a trap for liquids in said body adjacent said valve, said sleeve being open at its other end, and of a diameter substantially equal to that of said inlet, a rack on said sleeve, a pinion associated with said rack, means associated with said pinion normally biasing said valve to open position, but adapted upon the surge of liquid into said sleeve to permit closure of said valve under the impetus of pressure of said liquid, said last-named means comprising a lever secured to said pinion and means normally retaining said lever in position to hold said valve away from said valve seat, and an indicator associated with said lever for indicating the position of said valve and hence the amount of steam passing through said line.

4. In a safety device for steam lines, in combination, a body having an inlet and an outlet positioned in said line, a valve seat in said body at said outlet, a valve comprised of a hollow sleeve having a relatively large number of perforations therein normally to permit unrestricted flow of steam therethrough closed at one end to form a valve disk adjacent said valve seat slidably mounted in said body, means forming a trap for liquids in said body adjacent said valve, said sleeve being open at its other end, and of a diameter substantially equal to that of said inlet, a rack on said sleeve, a pinion associated with said rack, and means associated with said pinion normally biasing said valve to open position, but adapted upon the surge of liquid into said sleeve to permit closure of said valve under the impetus of pressure of said liquid, said last-mentioned means comprising a lever secured to said pinion means normally retaining said lever in position to hold said valve away from said valve seat, and an indicator associated with said lever for indicating the position of said valve and hence the amount of steam passing through said line, said means normally retaining said lever in position to hold said valve away from said valve seat including a spring connected between said lever and said indicator.

5. In a safety device for steam lines, in combination, a body having an inlet and an outlet positioned in said line, a valve seat in said body at said outlet, a valve comprised of a hollow sleeve having a relatively large number of perforations therein normally to permit unrestricted flow of steam therethrough closed at one end to form a valve disk adjacent said valve seat slidably mounted in said body, means forming a trap for liquids in said body adjacent said valve, said sleeve being open at its other end, and of a diameter substantially equal to that of said inlet, a rack on said sleeve, a pinion associated with said rack, and means associated with said pinion normally biasing said valve to open position, but adapted upon the surge of liquid into said sleeve to permit closure of said valve under the impetus of pressure of said liquid, said last-mentioned means comprising a lever secured to said pinion and means normally retaining said lever in position to hold said valve away from said valve seat, and an indicator associated with said lever for indicating the position of said valve and hence the amount of steam passing through said line, said means normally retaining said lever in position to hold said valve away from said valve seat including a weight mounted on the extending arm of said lever.

6. In a safety device for steam lines, in combination, a body having an inlet and an outlet positioned in said line, a valve seat in said body at said outlet, a valve comprised of a hollow sleeve having a relatively large number of perforations therein normally to permit unrestricted flow of steam therethrough closed at one end to form a valve disk adjacent said valve seat slidably mounted in said body, means forming a trap for liquids in said body adjacent said valve, said sleeve being open at its other end, and of a diameter substantially equal to that of said inlet, a rack on said sleeve, a pinion associated with said rack, and means associated with said pinion normally biasing said valve to open position, but adapted upon the surge of liquid into said sleeve to permit closure of said valve under the impetus of pressure of said liquid, said last-mentioned means comprising a lever secured to said pinion and means normally retaining said lever in position to hold said valve away from said valve seat, an indicator associated with said lever for indicating the position of said valve and hence the amount of steam passing through said line, said means normally retaining said lever in position to hold said valve away from said valve seat including a weight mounted on the extending arm of said lever, and means whereby said weight may be moved along the length of said extending arm of said lever to vary the pressure exerted thereby to retain said valve in open position.

TIMOTHY E. LAWLESS.